United States Patent
Yang

(10) Patent No.: US 9,609,578 B2
(45) Date of Patent: Mar. 28, 2017

(54) METHOD, APPARATUS AND SYSTEM FOR TRANSMITTING GATEWAY ADDRESS

(71) Applicant: China Academy of Telecommunications Technology, Beijing (CN)

(72) Inventor: Yi Yang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 26 days.

(21) Appl. No.: 14/383,641

(22) PCT Filed: Dec. 31, 2012

(86) PCT No.: PCT/CN2012/088121
§ 371 (c)(1),
(2) Date: Sep. 8, 2014

(87) PCT Pub. No.: WO2013/131403
PCT Pub. Date: Sep. 12, 2013

(65) Prior Publication Data
US 2015/0049747 A1 Feb. 19, 2015

(30) Foreign Application Priority Data

Mar. 8, 2012 (CN) .......................... 2012 1 0060323

(51) Int. Cl.
*H04W 80/04* (2009.01)
*H04W 48/08* (2009.01)
(Continued)

(52) U.S. Cl.
CPC ............. *H04W 48/08* (2013.01); *H04W 8/02* (2013.01); *H04W 24/02* (2013.01); *H04W 80/04* (2013.01); *H04W 8/06* (2013.01); *H04W 84/047* (2013.01)

(58) Field of Classification Search
CPC ..... H04W 80/04; H04W 88/06; H04W 36/18; H04W 72/04; H04L 12/28; H04L 29/06; H04L 45/00
See application file for complete search history.

(56) References Cited

U.S. PATENT DOCUMENTS

2009/0290540 A1* 11/2009 Cherian ................. H04L 47/10
370/328
2010/0008319 A1* 1/2010 Awano .................... H04L 47/10
370/329
(Continued)

FOREIGN PATENT DOCUMENTS

CN 101729337 A 6/2010
CN 101959268 A 1/2011
(Continued)

OTHER PUBLICATIONS

International Search Report for PCT/CN2013/072140.
(Continued)

*Primary Examiner* — Andrew Lee
(74) *Attorney, Agent, or Firm* — Kilpatrick Townsend & Stockton LLP

(57) ABSTRACT

This application relates to wireless communication technologies, and more particularly, to a method, a apparatus and a system for transmitting a gateway address, which are used to solve the problem in the prior art that a DeNB is incapable of assisting an MME in selecting an SGW/PGW for a mobile relay node (RN). The method for transmitting a gateway address in an embodiment of this application comprises: a base station determining, when determining an access device to be a mobile RN, a gateway IP address of a mobility anchor serving as a gateway of the mobile RN; and sending the determined gateway IP address to a mobility management entity (MME) corresponding to the mobile RN. In the embodiment of this application, the DeNB is capable of (Continued)

assisting the MME in selecting a suitable mobility anchor for the mobile RN as the SGW/PGW, thereby guaranteeing normal work of the mobile RN.

11 Claims, 5 Drawing Sheets

(51) Int. Cl.
*H04W 8/02* (2009.01)
*H04W 24/02* (2009.01)
*H04W 8/06* (2009.01)
*H04W 84/04* (2009.01)

(56) References Cited

U.S. PATENT DOCUMENTS

| | | | | |
|---|---|---|---|---|
| 2010/0311419 | A1* | 12/2010 | Bi | H04W 60/00 455/435.1 |
| 2011/0002297 | A1* | 1/2011 | Jain | H04L 12/66 370/331 |
| 2011/0019644 | A1* | 1/2011 | Cheon | H04W 36/0033 370/331 |
| 2011/0244851 | A1* | 10/2011 | Gunnarsson | H04W 8/26 455/423 |
| 2011/0269499 | A1* | 11/2011 | Vikberg | H04W 28/08 455/524 |
| 2012/0250509 | A1* | 10/2012 | Leung | H04W 76/04 370/235 |
| 2012/0276910 | A1* | 11/2012 | Zhang | H04W 36/0005 455/439 |
| 2013/0089022 | A1* | 4/2013 | Lu | H04W 36/08 370/315 |
| 2013/0163424 | A1* | 6/2013 | Goerke | H04W 24/02 370/235 |
| 2014/0071884 | A1* | 3/2014 | Sherman | H04W 4/22 370/315 |
| 2014/0106746 | A1* | 4/2014 | Liu | H04W 24/02 455/435.1 |
| 2014/0219188 | A1* | 8/2014 | Bertin | H04W 36/12 370/329 |

FOREIGN PATENT DOCUMENTS

| | | |
|---|---|---|
| CN | 102196403 A | 9/2011 |
| CN | 102821170 A | 12/2012 |
| WO | 2011/135764 A1 | 11/2011 |
| WO | 2011135764 A1 | 11/2011 |

OTHER PUBLICATIONS

3GPP TR 36.806 V0.3.1 (Feb. 2010), 3rd Generation Partnership Project; Technical Specification Group Radio Access Network; Evolved Universal Terrestrial Radio Access (E-UTRA); Relay architectures for E-UTRA (LTE-Advanced) (Release 9), 34 pages.
3GPP TSG-RAN WG2 Meeting #74, Barcelona, Espana May 9-13, 2011 (R2-113679), 103 pages.
3GPP TSG-RAN WG3 Meeting #74, San Francisco, USA, Nov. 14-18, 2011 (R3-113020), 3 pages.
3GPP TSG-RAN WG3 Meeting #75, Dresden, German, Feb. 6-10, 2012 (R3-120201), 2 pages.
3GPP TSG-RAN WG3 Meeting #75, Dresden, German, Feb. 6-10, 2012 (R3-120323), 2 pages.
The Office Action issued on Dec. 3, 2015 in the CN counterpart application (201210060323.0).

* cited by examiner

METHOD, APPARATUS AND SYSTEM FOR TRANSMITTING GATEWAY ADDRESS

This application is a US National Stage of International Application No. PCT/CN2012/088121, filed on Dec. 31, 2012, designating the United States and claiming priority to Chinese Patent Application No. 201210060323.0, filed with the Chinese Patent Office on Mar. 8, 2012 and entitled "Method, apparatus and system for transmitting gateway address", the content of which is hereby incorporated by reference in its entirety.

FIELD

The present invention relates to the field of wireless communications and particularly to a method, device and system for transmitting a gateway address.

BACKGROUND

A Relay Node (RN) is introduced to a Long Term Evolution-Advanced (LTE-A) system for increased network coverage, where the RN is connected with a Donor evolved Node B (DeNB) by a wireless network. The RN can further be applied to a railway and other mobile environments at a high speed to thereby lower the number of times that a User Equipment (UE) is handed over, to improve the quality of a signal in a carriage and other purposes.

FIG. 1 illustrates the network architecture of the LTE-A system with RN deployed in the prior art, where the RN accesses to an Evolved Packet Core (EPC) via a donor cell of the DeNB, while there is no wired interface between the RN and the EPC, and each RN can control one or more cells. In this architecture, an interface between the UE and the RN is referred to Uu interface, and an interface between the RN and the DeNB is referred to Un interface, where the DeNB is integrated with a part of a Serving Gateway/Packet Data Network Gateway (SGW/PGW) function. The RN includes a stationary RN and a mobile RN, where a relay node of which the location is unchanged is referred to stationary RN and a relay node which supports mobility is referred a mobile RN.

For the stationary RN, the stationary RN is served by the DeNB with the necessary SGW/PGW function. The DeNB transmits the Internet Protocol (IP) address of the SGW/PGW function integrated therewith to a Mobility Management Entity (MME) of the stationary RN, and after the RN is authenticated successfully, the MME selects the DeNB as a SGW/PGW of the RN according to the received IP address and sets up an S5 interface between the MME and the DeNB, and in the meantime the DeNB serves as an eNB of the stationary RN and there is a further S1-C interface between the DeNB and the MME of the stationary RN, as illustrated in FIG. 2.

For the mobile RN, the MME selects a Mobility Anchor as an SGW/PGW of the mobile RN and sets up an S5 interface between the MME and the mobility anchor. When accessing the network, the Mobility Anchor sets up an S1-C interface between the MME of the mobile RN and the Mobility Anchor in a manner of eNB, and when the mobile RN is handed over to another DeNB, the mobile RN only has the serving eNB (i.e., the DeNB) changed, the MME of the mobile RN sets up an S1-C signaling connection between the MME and the destination DeNB, and the mobility anchor transfers an S1-U tunnel borne by an Evolved Packet System (EPS) of the mobile RN from the source DeNB to the destination DeNB, as illustrated in FIG. 2.

In summary, the specification in the prior art only relates to how the DeNB assists the MME in selecting an SGW/PGW for the stationary RN when the stationary RN accesses the network, but doesn't relate to how the DeNB assists the MME in selecting a mobility anchor as an SGW/PGW for the mobile RN when the mobile RN accesses the network.

SUMMARY

Embodiments of the invention provide a method, device and system for transmitting a gateway address so as to address the problem in the prior art that a DeNB can't assist an MME in selecting a mobility anchor as an SGW/PGW for a mobile RN when the mobile RN accesses a network.

An embodiment of the invention provides a method for transmitting a gateway address, the method including:
 determining, by an eNB, a gateway IP address of a mobility anchor which serves as a gateway of a mobile RN upon determining an accessing device to be the mobile RN; and
 transmitting, by the eNB, the determined gateway IP address to a Mobility Management Entity, MME, serving for the mobile RN.

An embodiment of the invention provides a method for transmitting indication information, the method including:
 determining, by an accessing device, the indication information indicating a type of the accessing device; and
 transmitting, by the accessing device, the indication information to an eNB.

An embodiment of the invention provides a method for transmitting an own gateway address, the method including:
 receiving, by a mobility anchor, an Interface Setup Request message from an eNB; and
 transmitting, by the mobility anchor, its gateway IP address to the eNB.

An embodiment of the invention provides a method for authenticating an accessing device, the method including:
 determining, by an MME, that indication information received from an eNB indicates that the accessing device is a mobile RN and indication information in subscription data of the accessing device indicates that the accessing device is a mobile RN; and
 selecting, by the MME, a mobility anchor corresponding to a gateway IP address received from the eNB as a gateway of the mobile RN.

An embodiment of the invention provides an eNB for transmitting a gateway address, the eNB including:
 a first determination module configured, upon determining an accessing device to be a mobile RN, to determine a gateway IP address of a mobility anchor which serves as a gateway of the mobile RN; and
 a first transmission module configured to transmit the determined gateway IP address to an MME serving for the mobile RN.

An embodiment of the invention provides an accessing device for transmitting indication information, the accessing device including:
 a second determination module configured to determine the indication information indicating a type of the accessing device; and
 a second transmission module configured to transmit the indication information to an eNB.

An embodiment of the invention provides a mobility anchor for transmitting its gateway address, the mobility anchor including:
 a third determination module configured to receive an Interface Setup Request message from an eNB; and a third transmission module configured to transmit a gateway IP address of the mobility anchor to the eNB.

An embodiment of the invention provides an MME for authenticating an accessing device, the MME including:

a fourth determination module configured to determine that indication information received from an eNB indicates that the accessing device is a mobile RN and indication information in subscription data of the accessing device indicates that the accessing device is a mobile RN; and a processing module configured to select a mobility anchor corresponding to a gateway IP address received from the eNB as a gateway of the mobile RN.

An embodiment of the invention provides a system for transmitting a gateway address, the system including:

an accessing device configured to determine indication information indicating a type of the accessing device and to transmit the indication information to an eNB; and the eNB configured, upon determining the accessing device to be a mobile RN, to determine a gateway IP address of a mobility anchor which serves as a gateway of the mobile RN and to transmit the determined gateway IP address to an MME serving for the mobile RN.

In the embodiments of the invention, when the eNB determines the accessing device to be a mobile Relay Node (RN), the eNB determines a gateway IP address of a mobility anchor which serves as a gateway of the mobile RN and reports the determined gateway IP address to the MME serving for the mobile RN so that the DeNB can assist the MME in selecting an appropriate mobility anchor for the mobile RN as an SGW/PGA of the mobile RN when the mobile RN accesses the network, to thereby ensure that the mobile RN can operate normally.

DETAILED DESCRIPTION OF THE EMBODIMENTS

In embodiments of the invention, when an eNB determines an accessing device to be a mobile RN, the eNB determines a gateway IP address of a mobility anchor which serves as a gateway of the mobile RN and reports the determined gateway IP address to an MME serving for the mobile RN so that the DeNB can assist the MME in selecting an appropriate SGW/PGW for the mobile RN when the mobile RN accesses a network, to thereby ensure that the mobile RN can operate normally.

The embodiments of the invention will be described below in further details with reference to the drawings.

Figure 1:
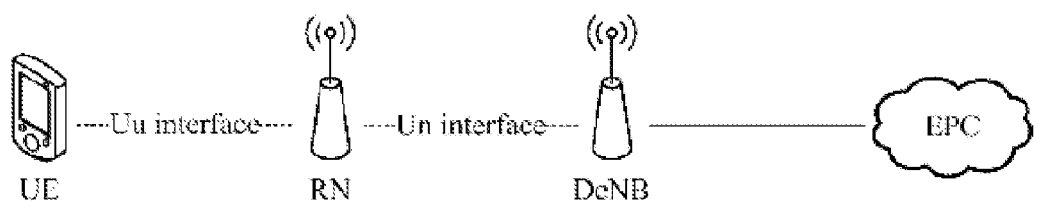
FIG. 1 illustrates the network architecture of the LTE-A system to which the RN is introduced in the prior art.
Figure 2:
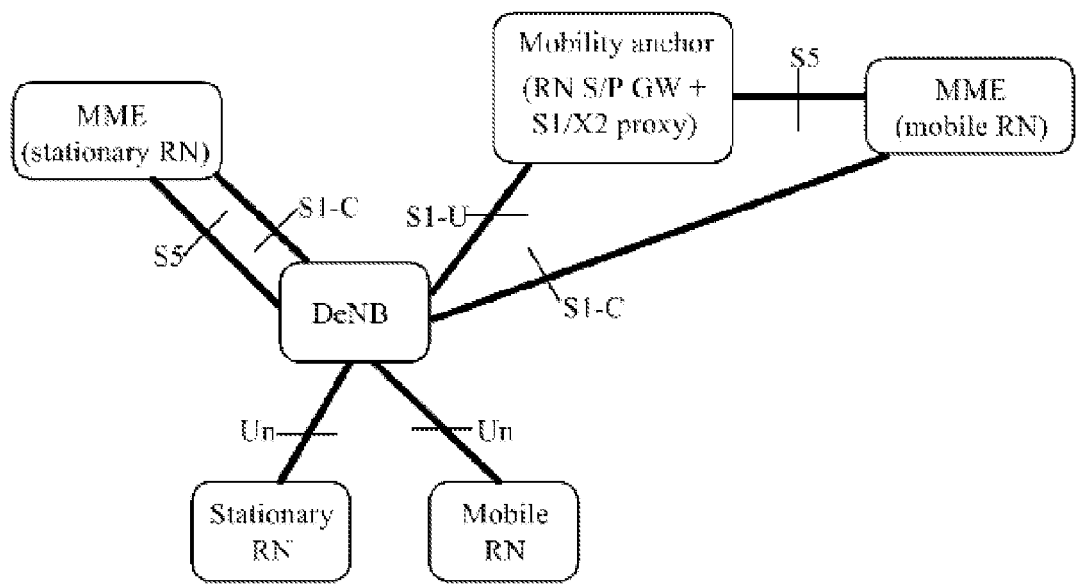
FIG. 2 illustrates a schematic diagram of relationships between the network nodes in the LTE-A system in which the stationary RN and the mobile RN are deployed in the prior art.
Figure 3:
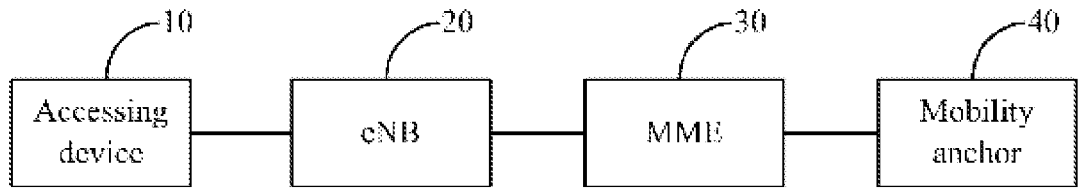
FIG. 3 illustrates a schematic structural diagram of a system for transmitting a gateway address according to an embodiment of the invention.

As illustrated in FIG. 3, a system for transmitting a gateway address according to an embodiment of the invention includes:

An accessing device 10, configured to determine indication information, which indicates a type of accessing device and to transmit the indication information to an eNB 20; and The eNB 20, configured to determine a gateway IP address of a mobility anchor which serves as a gateway of a mobile RN upon determining the accessing device 10 to be the mobile RN and to transmit the determined gateway IP address to an MME serving for the mobile RN.

In a particular implementation, when accessing a network, the accessing device 10 transmits the indication information, which indicates the type of accessing device, to the eNB 20, where the type of accessing device is a stationary RN or a mobile RN; for example, if the accessing device 10 transmits "0" to the eNB 20 indicating that the accessing device 10 is a stationary RN, then the eNB 20 knows that the accessing device 10 is a stationary RN upon reception of "0"; or if the accessing device 10 transmits "1" to the eNB 20 indicating that the accessing device 10 is a mobile RN, then the eNB 20 knows that the accessing device 10 is a mobile RN upon reception of "1".

It shall be noted that the present embodiment will not be limited to the indication pattern of "0" and "1", but any pattern capable of indicating a type of accessing device can be applicable to the present embodiment.

Preferably the accessing device 10 transmits the indication information in a Radio Resource Control (RRC) message; and Preferably the eNB 20 receives the indication information in the RRC message.

In a particular implementation, the eNB 20 determines the accessing device 10 to be a stationary RN or a mobile RN upon reception of the indication information transmitted by the accessing device 10;

If the accessing device 10 is a mobile RN, then the eNB 20 determines the gateway IP address of the mobility anchor which serves as a gateway of the mobile RN and transmits the determined gateway IP address to the MME 30; and Correspondingly after the MME 30 successfully authenticates the accessing device 10, the MME 30 selects an SGW/PGW for the mobile RN according to the gateway IP address transmitted from the eNB 20, that is, determines that the mobility anchor corresponding to the received gateway IP address serves as an SGW/PGW of the mobile RN.

If the accessing device 10 is a stationary RN, then the eNB 20 transmits an IP address of an SGW/PGW function integrated therewith and the indication information of the accessing device 10 to the MME 30 corresponding to the accessing device 10; and Correspondingly the MME 30 selects the eNB 20 as an SGW/PGW of the mobile RN according to the received IP address transmitted from the eNB 20 after the MME 30 authenticates successfully the accessing device 10.

Where the gateway IP address in the present embodiment is an IP address of an SGW/PGW function of the mobility anchor.

If there are more than one mobility anchors which can serve as a gateway of the mobile RN, then the eNB 20 can select the mobility anchor 40 as a gateway of the mobile RN as follows:

First scheme: the mobility anchor is selected according to a requirement of load balancing, for example, a different mobility anchor is selected each time when the mobility anchor is determined to serve as a gateway of the mobile RN, so that the number of mobile RNs connected with each mobility anchor is as even as possible to thereby avoid load imbalance;

Second scheme: the mobility anchor is selected dependent upon the capacity of each mobility anchor, for example, a larger number of mobile RNs can be served by a mobility anchor with a higher capacity, and a smaller number of mobile RNs can be served by a mobility anchor with a lower capacity.

Third scheme: the mobility anchor is selected randomly.

It shall be noted that the present embodiment will not be limited to the three selection schemes above, and any scheme capable of selecting one of the mobility anchors as the mobility anchor which serve as a gateway of the mobile RN can be applicable to the present embodiment.

In a particular implementation, the gateway IP address determined by the eNB 20 includes but will not be limited to one of the following gateway IP addresses:

1. A gateway IP address of the mobility anchor 40 pre-stored into the eNB 20;

2. A gateway IP address of the mobility anchor 40 downloaded by the eNB from an Operation and Maintenance (OAM) system;

3. An IP address of an S1 interface of the mobility anchor 40:

Particularly the eNB 20 can obtain the IP address of the S1 interface of the mobility anchor 40 in the same way that an eNB obtains an IP address of an S1 interface of an MME in the prior art, for example, the eNB 20 downloads the IP address of the S1 interface of the mobility anchor 40 from the OAM system;

4. An IP address of an X2 interface of the mobility anchor 40:

Particularly the eNB 20 can obtain the IP address of the S1 interface of the mobility anchor 40 in the same way that an eNB obtains an IP address of an X2 interface of an MME in the prior art, for example, the eNB 20 downloads the IP address of the X2 interface of the mobility anchor 40 from the OAM system; and 5. A gateway IP address of the mobility anchor 40, received by the eNB, returned from the mobility anchor 40:

Particularly the mobility anchor 40 returns its gateway IP address to the eNB 20 after an S1 interface is set up between the eNB 20 and the mobility anchor 40; or the mobility anchor 40 returns its gateway IP address to the eNB 20 after an X2 interface is set up between the eNB 20 and the mobility anchor 40.

If there are a plurality of gateway IP addresses available for selection by the eNB 20, for example, there are a plurality of gateway IP addresses of the mobility anchor pre-configured in the eNB 20 by an operator, or a plurality of gateway IP addresses of the mobility anchor downloaded by the eNB 20 from the OAM system, or a plurality of gateway IP addresses of the mobility anchor returned from the mobility anchor, or a plurality of IP addresses of the S1 interface of the mobility anchor, or a plurality of IP addresses of the X2 interface of the mobility anchor, and in another example, the gateway IP addresses available for selection include two or more of the gateway IP addresses above, but the eNB 20 can only determine one gateway IP address for each accessing mobile RN, then a different gateway IP address can be selected for each mobile RN or a gateway IP address can be selected randomly for each mobile RN.

It shall be noted that the present embodiment will not be limited to the scheme above to select a mobility anchor, but any scheme capable of selecting appropriate one of mobility anchors as a gateway of the mobile RN can be applicable to the present embodiment.

If the S1 interface (or the X2 interface) is set up between the eNB 20 and the mobility anchor 40, then before the S1 (or the X2 interface) is set up, the eNB 20 transmits an Interface Setup Request message to the mobility anchor 40.

The system for transmitting a gateway address according to the embodiment of the invention further includes:

The mobility anchor 40 is configured to receive the Interface Setup Request message from the eNB 20 and to transmit its gateway IP address to the eNB 20.

Preferably if the S1 interface is set up between the eNB 20 and the mobility anchor 40, then the eNB 20 indicates that the eNB is a donor eNB in all of transmitted S1 Interface Setup Request messages or indicates that the eNB is a donor eNB in an S1 Interface Setup Request message transmitted to the mobility anchor 40; and Correspondingly the mobility anchor 40 transmits its gateway IP address to the eNB 20 upon reception of the S1 Interface Setup Request message from the eNB 20;

Preferably the mobility anchor 40 transmits its gateway IP address to the eNB 20 upon determining that the S1 Interface Setup Request message includes identification information indicating that the eNB 20 is a donor eNB; and The mobility anchor 40 ends the process upon determining that the S1 Interface Setup Request message includes no identification information indicating that the eNB 20 is a donor eNB;

Where the eNB 20 can obtain those nodes which are a mobility anchor from the OAM system or otherwise.

Preferably if the X2 interface is set up between the eNB 20 and the mobility anchor 40, then the eNB 20 indicates that the eNB is a donor eNB in all of transmitted X2 Interface Setup Request messages or indicates that the eNB is a donor eNB in an X2 Interface Setup Request message transmitted to the mobility anchor 40; and Correspondingly the mobility anchor 40 transmits its gateway IP address to the eNB 20 upon reception of the X2 Interface Setup Request message from the eNB 20;

Preferably the mobility anchor 40 transmits its gateway IP address to the eNB 20 upon determining that the X2 Interface Setup Request message includes identification information indicating that the eNB 20 is a donor eNB; and The mobility anchor 40 ends the process upon determining that the X2 Interface Setup Request message includes no identification information indicating that the eNB 20 is a donor eNB;

Where the eNB 20 can obtain those nodes which are a mobility anchor from the OAM system or otherwise.

In a particular implementation, after the eNB receives the indication information transmitted from the accessing device 10, the eNB 20 transmits the indication information to the MME 30 corresponding to the accessing device 10 to indicate to the MME 30 that the accessing device 10 is a stationary RN or a mobile RN;

Preferably the eNB 20 transmits both the indication information of the accessing device 10 and the determined network IP address to the MME 30.

The system for transmitting a gateway address according to the embodiment of the invention further includes:

The MME 30 is configured to determine that the indication information received from the eNB 20 indicates that the accessing device 10 is a mobile RN and indication information in subscription data of the accessing device 10 indicates that the accessing device 10 is a mobile RN, and to select the mobility anchor corresponding to the gateway IP address received from the eNB 20 as a gateway of the mobile RN.

In a particular implementation, the MME 30 authenticates the accessing device 10 as follows:

If the MME 30 determines that the received indication information transmitted from the eNB 20 indicates that the accessing device 10 is a mobile RN and the indication information in the subscription data of the accessing device 10 obtained by the MME 30 also indicates that the accessing device 10 is a mobile RN, then the authentication succeeds, and the MME 30 determines that the accessing device 10 is a mobile RN; or if the MME 30 determines that the received indication information transmitted from the eNB 20 indicates that the accessing device 10 is a mobile RN and the indication information in the subscription data of the accessing device 10 obtained by the MME 30 indicates that the accessing device 10 is a stationary RN, then the authentication fails, and the MME 30 can reject the accessing device 10 for accessing the network.

Particularly the MME 30 can obtain the subscription data of the accessing device from a Home Subscriber Server (HSS).

The MME 30 selects the mobility anchor corresponding to the gateway IP address received from the eNB 20 as a gateway of the mobile RN according to the gateway IP address after the mobile RN is authenticated successfully.

It shall be noted that the MME serving for the stationary RN and the MME serving for the mobile RN in the present embodiment can be the same MME or can be different MMEs.

The eNB in the system according to the embodiment of the system can be an eNB, a DeNB, etc.

Based upon the same inventive idea, an embodiment of the invention further provides an eNB for transmitting a gateway address, and since the eNB addresses the problem under a similar principle to the eNB in the system illustrated in FIG. 3, reference can be made to the implementation of the eNB in the system for an implementation of the present eNB, so a repeated description thereof will be omitted here.

Figure 4:
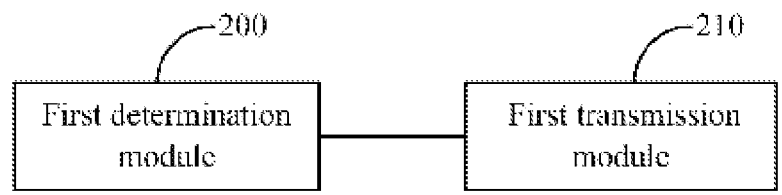
FIG. 4 illustrates a schematic structural diagram of an eNB for transmitting a gateway address according to an embodiment of the invention.

As illustrated in FIG. 4, the eNB 20 for transmitting a gateway address according to the embodiment of the invention includes:

A first determination module 200 is configured, upon determining an accessing device to be a mobile RN, to determine a gateway IP address of a mobility anchor which serves as a gateway of the mobile RN; and A first transmission module 210 is configured to transmit the determined gateway IP address to an MME serving for the mobile RN.

The first transmission module 210 is further configured:

When there are more than one mobility anchors, to select one of the mobility anchors as a gateway of the mobile RN according to a requirement of load balancing; or To select one of the mobility anchors as a gateway of the mobile RN dependent upon capacity of each mobility anchor; or To select randomly one of the mobility anchors as a gateway of the mobile RN.

In a particular implementation, the gateway IP address determined by the first determination module 200 is one of the following gateway IP addresses:

A gateway IP address of the mobility anchor pre-stored into the eNB 20;

A gateway IP address of the mobility anchor obtained by the eNB 20 from an OAM system;

An IP address of an S1 interface of the mobility anchor;

An IP address of an X2 interface of the mobility anchor; and

A gateway IP address of the mobility anchor, received by the eNB 20, returned from the mobility anchor.

In a particular implementation, the first transmission module 210 is further configured:

To indicate that the eNB is a donor eNB in all of transmitted S1 Interface Setup Request messages, or to indicate that the eNB is a donor eNB in an S1 Interface Setup Request message transmitted to the mobility anchor, before the S1 interface is set up between the eNB 20 and the mobility anchor; or To indicate that the eNB is a donor eNB in all of transmitted X2 Interface Setup Request messages, or to indicate that the eNB is a donor eNB in an X2 Interface Setup Request message transmitted to the mobility anchor, before the X2 interface is set up between the eNB 20 and the mobility anchor.

In a particular implementation, the first determination module 200 is further configured:

To determine the accessing device 10 to be a stationary RN or a mobile RN according to indication information received from the accessing device 10.

In a particular implementation, the first transmission module 210 is further configured:

To transmit the indication information to the MME 30 corresponding to the mobile RN to indicate to the MME 30 that the accessing device 10 is a mobile RN.

In a particular implementation, the first determination module 200 is further configured:

To receive the indication information in an RRC message.

Based upon the same inventive idea, an embodiment of the invention further provides an accessing device for transmitting indication information, and since the accessing device addresses the problem under a similar principle to the accessing device in the system illustrated in FIG. 3, reference can be made to the implementation of the accessing device in the system for an implementation of the present accessing device, so a repeated description thereof will be omitted here.

Figure 5:
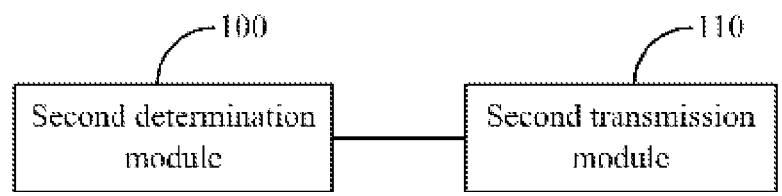
FIG. 5 illustrates a schematic structural diagram of a mobile RN for transmitting indication information according to an embodiment of the invention.

As illustrated in FIG. 5, the accessing device 10 for transmitting indication information according to the embodiment of the invention includes:

A second determination module 100 is configured to determine indication information indicating a type of the accessing device; and A second transmission module 110 is configured to transmit the indication information to an eNB.

Where the type of the accessing device is a stationary RN or a mobile RN.

In a particular implementation, the second transmission module 110 is further configured to transmit the indication information in an RRC message.

Based upon the same inventive idea, an embodiment of the invention further provides a mobility anchor for transmitting its own gateway address, and since the mobility anchor addresses the problem under a similar principle to the mobility anchor in the system illustrated in FIG. 3, reference can be made to the implementation of the mobility anchor in the system for an implementation of the present mobility anchor, so a repeated description thereof will be omitted here.

Figure 6:
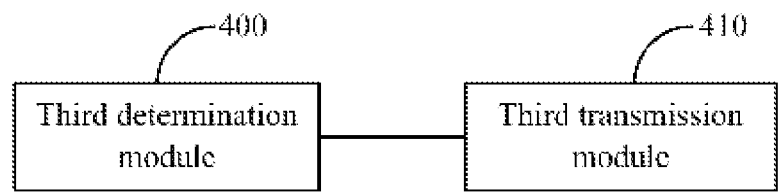
FIG. 6 illustrates a schematic structural diagram of a mobility anchor for transmitting its gateway address according to an embodiment of the invention.

As illustrated in FIG. 6, the mobility anchor 40 for transmitting a gateway address according to the embodiment of the invention includes:

A third determination module 400 is configured to receive an Interface Setup Request message from an eNB; and A third transmission module 410 is configured to transmit a gateway IP address of the mobility anchor to the eNB.

In a particular implementation, the third transmission module 410 is further configured:

To transmit the gateway IP address of the mobility anchor 40 to the eNB 20 after determining that the Interface Setup Request message includes identification information indicating that the eNB is a donor eNB.

Based upon the same inventive idea, an embodiment of the invention further provides an MME for authenticating an accessing device, and since the MME addresses the problem under a similar principle to the MME in the system illustrated in FIG. 3, reference can be made to the implementation of the MME in the system for an implementation of the present MME, so a repeated description thereof will be omitted here.

Figure 7:
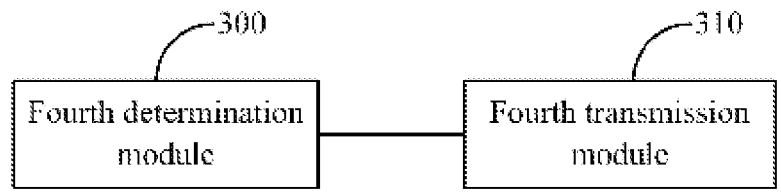
FIG. 7 illustrates a schematic structural diagram of an MME for authenticating a mobile RN according to an embodiment of the invention.

As illustrated in FIG. 7, the MME 30 for authenticating an accessing device according to the embodiment of the invention includes:

A fourth determination module 300 is configured to determine that indication information received from the eNB 20 indicates that the accessing device 10 is a mobile RN and indication information in subscription data of the accessing device 10 indicates that the accessing device 10 is a mobile RN; and A processing module 310 is configured to select the mobility anchor 40 corresponding to a gateway IP address received from the eNB 20 as a gateway of the mobile RN.

Based upon the same inventive idea, an embodiment of the invention further provides a method for transmitting a gateway address, and since the method addresses the problem under a similar principle to the eNB in the system illustrated in FIG. 3, reference can be made to the implementation of the eNB in the system for an implementation of the method, so a repeated description thereof will be omitted here.

Figure 8:
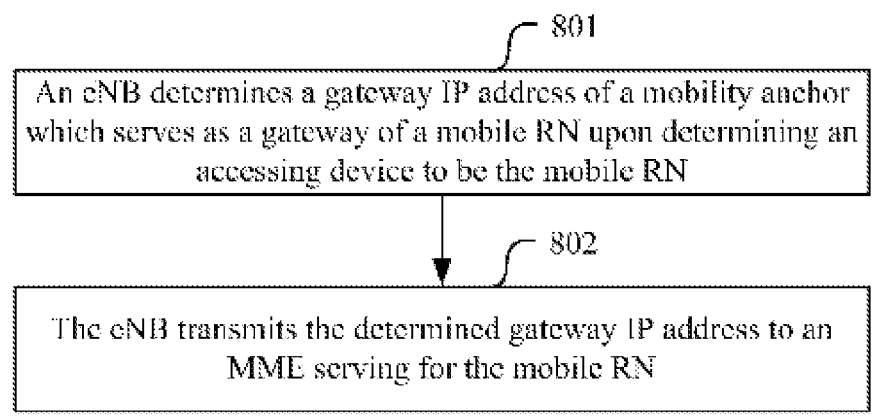
FIG. 8 illustrates a schematic flow chart of a method for transmitting a gateway address according to an embodiment of the invention.

As illustrated in FIG. 8, the method for transmitting a gateway address according to the embodiment of the invention includes the following steps:

In the step 801, an eNB determines a gateway IP address of a mobility anchor which serves as a gateway of a mobile RN upon determining an accessing device to be the mobile RN; and In the step 802, the eNB transmits the determined gateway IP address to an MME serving for the mobile RN.

In a particular implementation, when the eNB determines the accessing device to be a stationary RN, the eNB transmits an IP address of an SGW/PGW function integrated therewith, and indication information indicating that a type of accessing device is a stationary RN, to the MME serving for the stationary RN.

In a particular implementation, if there are more than one mobility anchors, then before the eNB determines the gateway IP address of the mobility anchor, the method further includes:

The eNB selects one of the mobility anchors as a gateway of the mobile RN according to a requirement of load balancing; or selects one of the mobility anchors as a gateway of the mobile RN dependent upon capacity of each mobility anchor; or selects randomly one of the mobility anchors as a gateway of the mobile RN.

In a particular implementation, the gateway IP address determined by the eNB is one of the following gateway IP addresses:

A gateway IP address of the mobility anchor pre-stored into the eNB;

A gateway IP address of the mobility anchor obtained by the eNB from an Operation and Maintenance (OAM) system;

An IP address of an S1 interface of the mobility anchor;

An IP address of an X2 interface of the mobility anchor; and

A gateway IP address of the mobility anchor, received by the eNB, returned from the mobility anchor.

Where the eNB can obtain the IP address of the S1 interface of the mobility anchor in the same way that an eNB obtains an IP address of an S1 interface of an MME in the prior art, for example, the eNB downloads it from the OAM system; and The eNB can obtain the IP address of the X2 interface of the mobility anchor in the same way that an eNB obtains an IP address of an X2 interface of an MME in the prior art, for example, the eNB downloads it from the OAM system.

Preferably if the S1 interface is set up between the eNB and the mobility anchor, then the eNB indicates that the eNB is a donor eNB in all of transmitted S1 Interface Setup Request messages or indicates that the eNB is a donor eNB in an S1 Setup Interface Request message transmitted to the mobility anchor; or If the X2 interface is set up between the eNB and the mobility anchor, then before the X2 interface is set up, the method further includes: the eNB indicates that the eNB is a donor eNB in all of transmitted X2 Interface Setup Request messages, or indicates that the eNB is a donor eNB in an X2 Interface Setup Request message transmitted to the mobility anchor.

In a particular implementation, the eNB determines the accessing device to be a stationary RN or a mobile RN in the following steps:

The eNB determines the accessing device to be a stationary RN or a mobile RN according to indication information received from the accessing device, where the indication information is information for indicating the type of accessing device, and the type of the accessing device is a stationary RN or a mobile RN.

For example, if the accessing device transmits "0" to the eNB indicating that the accessing device is a stationary RN, then the eNB knows that the accessing device is a stationary RN upon reception of "0"; or if the accessing device transmits "1" to the eNB indicating that the accessing device is a mobile RN, then the eNB knows that the accessing device is a mobile RN upon reception of "1".

It shall be noted that the present embodiment will not be limited to the indication pattern of "0" and "1", but any pattern capable of indicating a type of accessing device can be applicable to the present embodiment.

In a particular implementation, after the eNB receives the indication information from the accessing device, the eNB transmits the indication information to the MME serving for the mobile RN to indicate to the MME that the accessing device is a mobile RN.

Preferably the eNB transmits both the indication information and the determined gateway IP address to the MME upon determining the accessing device to be a mobile RN.

Preferably the eNB receives the indication information transmitted by the accessing device in a Radio Resource Control (RRC) message.

Based upon the same inventive idea, an embodiment of the invention further provides a method for transmitting indication information, and since the method addresses the problem under a similar principle to the accessing device in the system illustrated in FIG. 3, reference can be made to the implementation of the accessing device in the system for an implementation of the method, so a repeated description thereof will be omitted here.

Figure 9:
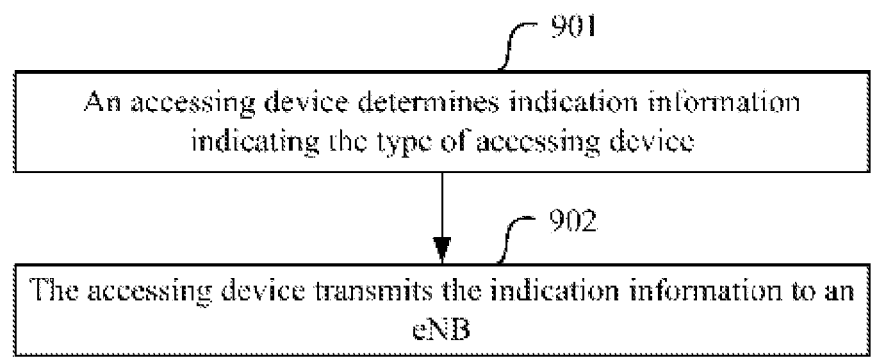
FIG. 9 illustrates a schematic flow chart of a method for transmitting indication information according to an embodiment of the invention.

As illustrated in FIG. 9, the method for transmitting indication information according to the embodiment of the invention includes the following steps:

In the step 901, an accessing device determines indication information indicating a type of the accessing device; and In the step 902, the accessing device transmits the indication information to an eNB.

Where the type of accessing device is a stationary RN or a mobile RN.

In the step 902, the accessing device transmits the indication information to the eNB to notify the eNB that the accessing device is a stationary RN or a mobile RN; and when the accessing device is a stationary RN, the eNB transmits an IP address of an SGW/PGW function integrated therewith and indication information of the stationary RN to an MME serving for the stationary RN; or when the accessing device is a mobile RN, the eNB determines a gateway IP address of a mobility anchor which serves as a gateway of the mobile RN and transmits the gateway IP address and indication information of the mobile RN to the MME serving for the stationary RN.

Preferably the accessing device transmits the indication information to the eNB in an RRC message.

Based upon the same inventive idea, an embodiment of the invention further provides a method for transmitting an own gateway address, and since the method addresses the problem under a similar principle to the mobility anchor in the system illustrated in FIG. 3, reference can be made to the implementation of the mobility anchor in the system for an implementation of the method, so a repeated description thereof will be omitted here.

Figure 10:
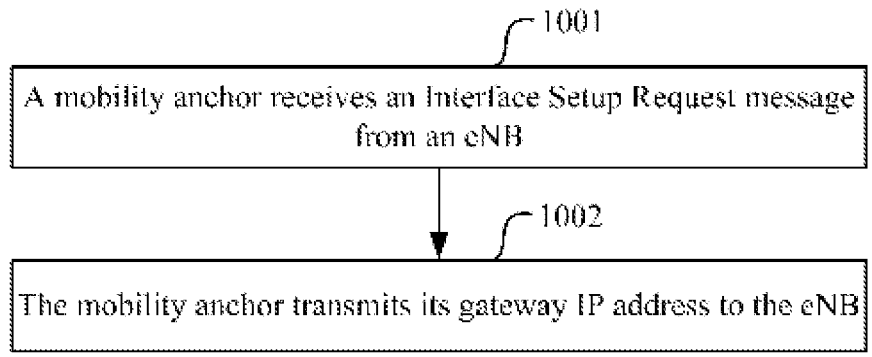
FIG. 10 illustrates a schematic flow chart of a method for transmitting an own gateway address according to an embodiment of the invention.

As illustrated in FIG. 10, the method for transmitting an own gateway address according to the embodiment of the invention includes the following steps:

In the step 1001, a mobility anchor receives an Interface Setup Request message from an eNB; and In the step 1002, the mobility anchor transmits its gateway IP address to the eNB.

Where the Interface Setup Request message includes an S1 Interface Setup Request message and/or an X2 Setup Interface Request message.

In a particular implementation, the mobility anchor transmits its gateway IP address to all of eNBs transmitting the Interface Setup Request message; or Before transmitting its gateway IP address to the eNB, the mobility anchor determines from the received Interface Setup Request message whether the Interface Setup Request message includes identification information indicating that the eNB is a donor eNB; and If so, that is, the transmitted Interface Setup Request message includes identification information indicating that a type of eNB is a donor eNB, then the mobility anchor transmits its gateway IP address to the eNB; and Otherwise, that is, the transmitted Interface Setup Request message does not include the identification information, then the mobility anchor does not transmit its gateway IP address to the eNB.

Based upon the same inventive idea, an embodiment of the invention further provides a method for authenticating an accessing device, and since the method addresses the problem under a similar principle to the MME in the system illustrated in FIG. 3, reference can be made to the implementation of the MME in the system for an implementation of the method, so a repeated description thereof will be omitted here.

Figure 11:
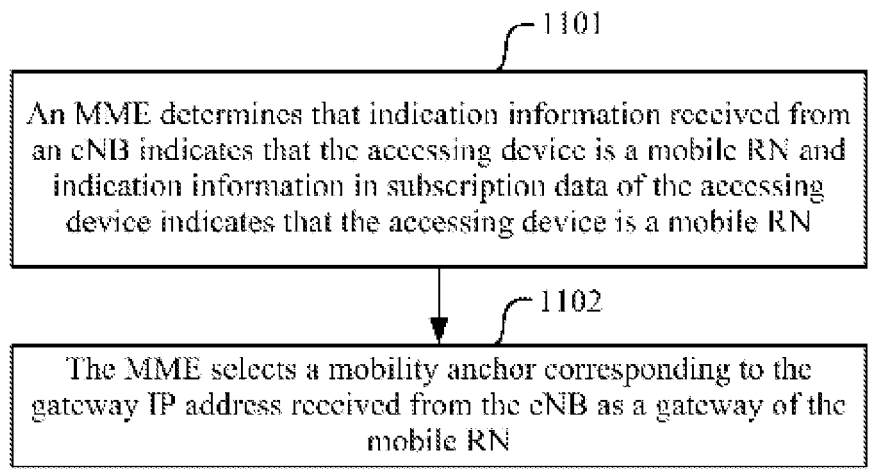
FIG. 11 illustrates a schematic flow chart of a method for authenticating a mobile RN according to an embodiment of the invention.

As illustrated in FIG. 11, the method for authenticating an accessing device according to the embodiment of the invention includes the following steps:

In the step 1101, an MME determines that indication information received from an eNB indicates that the accessing device is a mobile RN and indication information in subscription data of the accessing device indicates that the accessing device is a mobile RN; and In the step 1102, the MME selects a mobility anchor corresponding to a gateway IP address received from the eNB as a gateway of the mobile RN.

In a particular implementation, the MME can obtain the subscription data of the accessing device from an HSS.

In the embodiment of the invention, the gateway IP address and the indication information transmitted from the eNB to the MME is carried in an S1 Application Protocol (S1AP) message.

Interaction between the respective devices in the system for transmitting a gateway IP address according to the embodiment of the invention will be described below in details taking a process of attachment of a mobile RN as an example. In the process of attachment of the mobile RN, the gateway IP address and the indication information transmitted from the eNB to the MME is carried in an Initial UE message which is an S1AP message.

Figure 12:
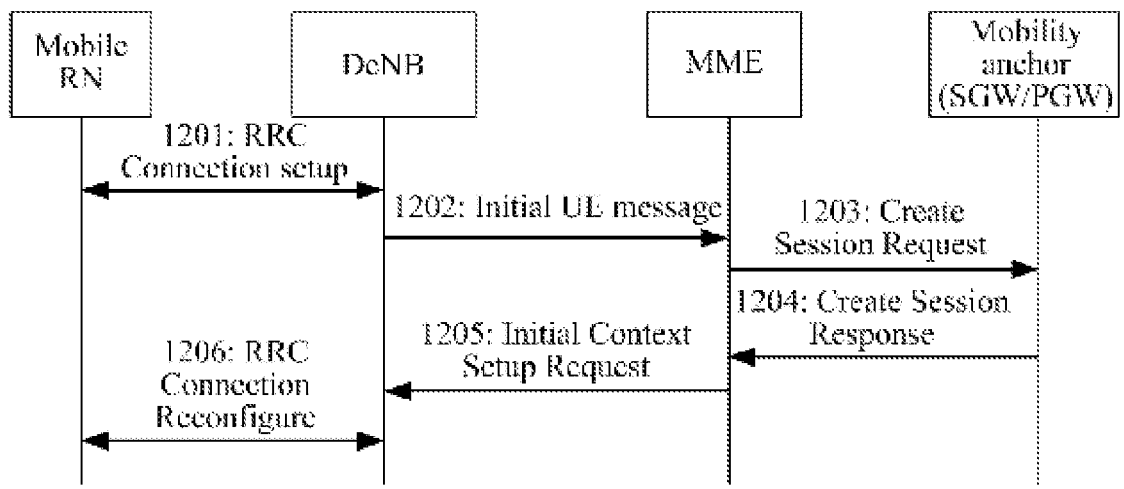
FIG. 12 illustrates a schematic flow chart of a first process of attachment of a mobile RN according to an embodiment of the invention.

As illustrated in FIG. 12, a first process of attachment of a mobile RN according to an embodiment of the invention includes the following steps:

In the step 1201, the mobile RN sets up an RRC connection with a DeNB (i.e., RRC Connection Setup) and notifies in an RRC message the DeNB that it is a mobile RN;

Particularly after the mobile RN completes setting up of the connection with the DeNB (i.e., RRC Connection Setup Complete), the mobile RN can carry indication information of the identity of the mobile RN in the RRC message transmitted to the DeNB.

In the step 1202, the DeNB determines the accessing device to be a mobile RN from the received indication information, determines a gateway IP address of a mobility anchor which serves as a gateway of the mobile RN and transmits the indication information and the determined gateway IP address of the mobility anchor to an MME serving for the mobile RN in an Initial UE message.

Particularly the gateway IP address of the mobility anchor can be pre-configured in the DeNB by an operator, or the DeNB can download the gateway IP address of the mobility anchor from an OAM system, or the DeNB can determine an IP address of an S1 interface of the mobility anchor to be the gateway IP address of the mobility anchor, or the DeNB can determine an IP address of an X2 interface of the mobility anchor to be the gateway IP address of the mobility anchor;

Where the DeNB can obtain the IP address of the S1 interface (or the X2 interface) of the mobility anchor in the same way that an eNB obtains an IP address of an S1 interface (or an X2 interface) of an MME in the prior art, for example, the DeNB downloads the IP address of the S1 interface (or the X2 interface) of the mobility anchor from the OAM system;

In a particular implementation, if there are more than one mobility anchors, then the DeNB can select one of the mobility anchors as a gateway of the mobile RN according to a requirement of load balancing; or select one of the mobility anchors as a gateway of the mobile RN dependent upon capacity of each mobility anchor; or select randomly one of the mobility anchors as a gateway of the mobile RN.

In the step 1203, after the mobile RN is authenticated successfully by a core network, the MME selects an SGW/PGW for the mobile RN according to the received gateway IP address of the mobility anchor, and transmits a Create Session Request to the mobility anchor;

In the step 1204, upon reception of the Create Session Request transmitted from the MME, the mobility anchor sets up an EPS bearer context for the mobile RN and returns a Create Session Response message to the MME;

In the step 1205, upon reception of the Create Session Response message returned from the mobility anchor, the MME transmits an Initial Context Setup Request message to the DeNB and sets up the context of the mobile RN in the DeNB; and In the step 1206, the DeNB sets up a Data Radio Bearer (DRB) with the mobile RN in a RRC Connection Reconfigure procedure.

Figure 13:
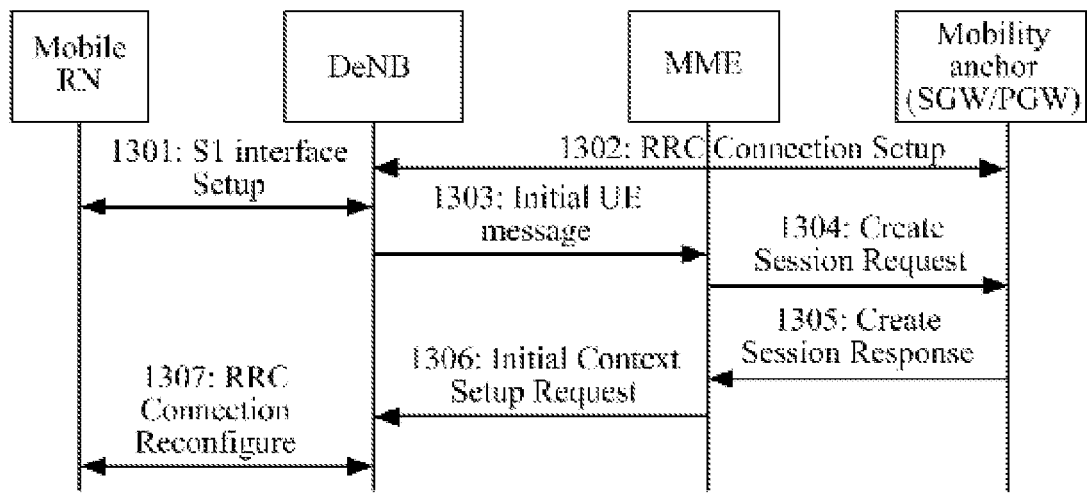
FIG. 13 illustrates a schematic flow chart of a second process of attachment of a mobile RN according to an embodiment of the invention.

As illustrated in FIG. 13, a second process of attachment of a mobile RN according to an embodiment of the invention includes the following steps:

In the step 1301, an S1 interface is set up between the DeNB and a mobility anchor (S1 Setup), and the mobility anchor returns an IP address of its SGW/PGW function to the DeNB;

In a particular implementation, the mobility anchor can transmit the IP address of its SGW/PGW function to all of eNBs between which and the mobility anchor the S1 interface is set up; or Upon determining an eNB, between which and the mobility anchor the S1 interface is set up, to be a DeNB, the mobility anchor can transmit the IP address of its SGW/PGW function to the DeNB, where the DeNB can indicate the mobility anchor that its type is a DeNB in an S1 Interface Setup Request message transmitted to the mobility anchor.

In a particular implementation, the DeNB can indicate that its type is a DeNB in all of transmitted S1 Interface Setup Request messages; or Only when the S1 interface is set up between the DeNB and a node with its type being a mobility anchor, the DeNB can indicate that its type is a DeNB in an S1 Interface Setup Request message transmitted to the mobility anchor, and particularly the DeNB can determine which nodes to be a mobility anchor from an OAM system or otherwise.

In the step 1302, the mobile RN sets up an RRC connection with the DeNB (i.e. RRC Connection Setup) and notifies in an RRC message the DeNB that it is a mobile RN;

Particularly after the mobile RN completes setting up of the connection with the DeNB (i.e., RRC Connection Setup Complete), the mobile RN can carry indication information of the identity of the mobile RN in the RRC message transmitted to the DeNB.

In the step 1303, the DeNB determines the accessing device to be a mobile RN from the received indication information, determines a gateway IP address of a mobility anchor which serves as a gateway of the mobile RN, and transmits the indication information and the determined gateway IP address of the mobility anchor to an MME serving for the mobile RN in an Initial UE message.

Particularly the gateway IP address of the mobility anchor can be pre-configured in the DeNB by an operator, or the DeNB can download the gateway IP address of the mobility anchor from an OAM system, or the DeNB can determine an IP address of an S1 interface of the mobility anchor to be the gateway IP address of the mobility anchor, or the DeNB can determine a gateway IP address of the mobility anchor returned from the mobility anchor to be the gateway IP address of the mobility anchor;

The DeNB can obtain the IP address of the S1 interface of the mobility anchor in the same way that an eNB obtains an IP address of an S1 interface of an MME in the prior art, for example, the DeNB downloads the IP address of the S1 interface of the mobility anchor from the OAM system;

In a particular implementation, if there are more than one mobility anchors, then the DeNB can select appropriate one of the mobility anchors as a gateway of the mobile RN according to a requirement of load balancing; or select appropriate one of the mobility anchors as a gateway of the mobile RN dependent upon capacity of each mobility anchor; or select randomly appropriate one of the mobility anchors as a gateway of the mobile RN.

In the step 1304, after the mobile RN is authenticated successfully by a core network, the MME selects an SGW/PGW for the mobile RN according to the received gateway IP address of the mobility anchor, and transmits a Create Session Request to the mobility anchor;

In the step 1305, upon reception of the Create Session Request transmitted from the MME, the mobility anchor sets up an EPS bearer context for the mobile RN and returns a Create Session Response message to the MME;

In the step 1306, upon reception of the Create Session Response message returned from the mobility anchor, the MME transmits an Initial Context Setup Request message to the DeNB and sets up the context of the mobile RN in the DeNB; and In the step 1307, the DeNB sets up a DRB with the mobile RN in a RRC Connection Reconfigure procedure.

Figure 14:
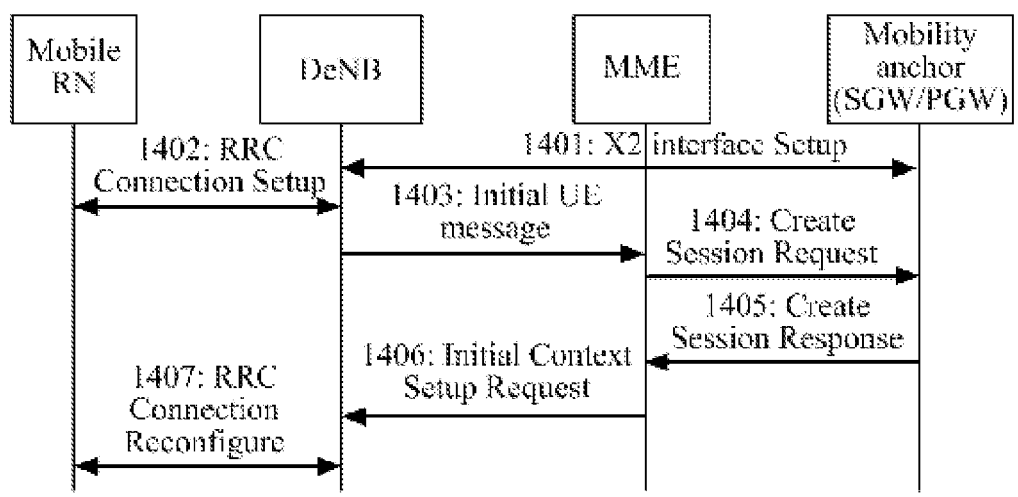
FIG. 14 illustrates a schematic flow chart of a third process of attachment of a mobile RN according to an embodiment of the invention.

As illustrated in FIG. 14, a third process of attachment of a mobile RN according to an embodiment of the invention includes the following steps:

In the step 1401, an X2 interface is set up between a DeNB and a mobility anchor (X2 Setup), and the mobility anchor returns an IP address of its SGW/PGW function to the DeNB;

In a particular implementation, the mobility anchor can transmit the IP address of its SGW/PGW function to all of eNBs between which and the mobility anchor the X2 interface is set up; or Upon determining an eNB, between which and the mobility anchor the X2 interface is set up, to be a DeNB, the mobility anchor can transmit the IP address of its SGW/

PGW function to the DeNB, where the DeNB can indicate the mobility anchor that its type is a DeNB in an X2 Interface Setup Request message transmitted to the mobility anchor.

In a particular implementation, the DeNB can indicate that its type is a DeNB in all of transmitted X2 Interface Setup Request messages; or Only when the X2 interface is set up between the DeNB and a node with its type being a mobility anchor, the DeNB can indicate that its type is a DeNB in an X2 Interface Setup Request message transmitted to the mobility anchor, and particularly the DeNB can determine which nodes to be a mobility anchor from an OAM system or otherwise.

In the step 1402, the mobile RN sets up an RRC connection with the DeNB (i.e., RRC Connection Setup) and notifies in an RRC message the DeNB that it is a mobile RN;

Particularly after the mobile RN completes setting up of the connection with the DeNB (i.e., RRC Connection Setup Complete), the mobile RN can carry indication information of the identity of the mobile RN in the RRC message transmitted to the DeNB.

In the step 1403, the DeNB determines the accessing device to be a mobile RN from the received indication information, determines a gateway IP address of a mobility anchor which serves as a gateway of the mobile RN, and transmits the indication information and the determined gateway IP address of the mobility anchor to an MME serving for the mobile RN in an Initial UE message.

Particularly the gateway IP address of the mobility anchor can be pre-configured in the DeNB by an operator, or the DeNB can download the gateway IP address of the mobility anchor from an OAM system, or the DeNB can determine an IP address of an X2 interface of the mobility anchor to be the gateway IP address of the mobility anchor, or the DeNB can determine a gateway IP address of the mobility anchor returned from the mobility anchor to be the gateway IP address of the mobility anchor;

The DeNB can obtain the IP address of the X2 interface of the mobility anchor in the same way that an eNB obtains an IP address of an X2 interface of an MME in the prior art, for example, the DeNB downloads the IP address of the X2 interface of the mobility anchor from the OAM system;

In a particular implementation, if there are more than one mobility anchors, then the DeNB can select appropriate one of the mobility anchors as a gateway of the mobile RN according to a requirement of load balancing; or select appropriate one of the mobility anchors as a gateway of the mobile RN dependent upon capacity of each mobility anchor; or select randomly appropriate one of the mobility anchors as a gateway of the mobile RN.

In the step 1404, after the mobile RN is authenticated successfully by a core network, the MME selects an SGW/PGW for the mobile RN according to the received gateway IP address of the mobility anchor, and transmits a Create Session Request to the mobility anchor;

In the step 1405, upon reception of the Create Session Request transmitted from the MME, the mobility anchor sets up an EPS bearer context for the mobile RN and returns a Create Session Response message to the MME;

In the step 1406, upon reception of the Create Session Response message returned from the mobility anchor, the MME transmits an Initial Context Setup Request message to the DeNB and sets up the context of the mobile RN in the DeNB; and In the step 1407, the DeNB sets up a DRB with the mobile RN in a RRC Connection Reconfigure procedure.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

In the embodiments of the invention, when the eNB determines the accessing device to be a mobile RN, the eNB determines a gateway IP address of a mobility anchor which serves as a gateway of the mobile RN and reports the determined gateway IP address to the MME serving for the mobile RN so that the DeNB can assist the MME in selecting an appropriate mobility anchor for the mobile RN as an SGW/PGA of the mobile RN when the mobile RN accesses the network, to thereby ensure that the mobile RN can operate normally.

With the embodiments of the invention, the existing DeNB device supporting a stationary RN can be upgraded to thereby support both a stationary RN and a mobile RN so as to alleviate the modification to the existing DeNB device so that the same DeNB device can be applicable to a larger number of scenarios to thereby facilitate the extension of a product market.

With the embodiments of the invention, the MME supporting a stationary RN can be reused to serve a mobile RN, and the MME can be enabled to select a gateway without being upgraded to thereby lower a cost of upgrading and developing the device so that the same MME can be applicable to a larger number of scenarios to thereby facilitate the extension of a product market.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting a gateway address, wherein the method comprises:
   determining, by an eNB, a gateway IP address of a mobility anchor which serves as a gateway of a mobile Relay Node, RN, upon determining an accessing device to be the mobile RN; and
   transmitting, by the eNB, the determined gateway IP address to a Mobility Management Entity, MME, serving for the mobile RN,
   wherein before determining the gateway IP address of the mobility anchor, the method further comprises: transmitting, by the eNB, an Interface Setup Request messages comprising identification information indicating that the eNB is a donor eNB.

2. The method according to claim 1, wherein if there are more than one mobility anchors, then before the eNB determines the gateway IP address of the mobility anchor, the method further comprises:
   selecting, by the eNB, one of the mobility anchors as the gateway of the mobile RN according to a requirement of load balancing; or
   selecting one of the mobility anchors as the gateway of the mobile RN dependent upon capacity of each mobility anchor; or
   selecting randomly one of the mobility anchors as the gateway of the mobile RN.

3. The method according to claim 1, wherein the gateway IP address determined by the eNB is one of:
   an IP address of an S1 interface of the mobility anchor; and
   an IP address of an X2 interface of the mobility anchor.

4. The method according to claim 3, wherein if the S1 interface is set up between the eNB and the mobility anchor, then before the S1 interface is set up, the method further comprises: the eNB indicating that the eNB is a donor eNB in all of transmitted S1 Interface Setup Request messages, or the eNB indicating that the eNB is a donor eNB in an S1 Interface Setup Request message transmitted to the mobility anchor; or
   if the X2 interface is set up between the eNB and the mobility anchor, then before the X2 interface is set up, the method further comprises: the eNB indicating that the eNB is a donor eNB in all of transmitted X2 Interface Setup Request messages, or the eNB indicating that the eNB is a donor eNB in an X2 Interface Setup Request message transmitted to the mobility anchor.

5. The method according to claim 1, wherein the eNB determines the accessing device to be a stationary RN or a mobile RN in a way that:
   the eNB determines the accessing device to be a stationary RN or a mobile RN according to indication information received from the accessing device.

6. The method according to claim 5, wherein after the eNB receives the indication information from the accessing device, the method further comprises:
   transmitting, by the eNB, the indication information to the MME serving for the mobile RN to indicate to the MME that the accessing device is a mobile RN.

7. The method according to claim 5, wherein the eNB receives the indication information from a Radio Resource Control, RRC, message.

8. The method according to claim 2, wherein the eNB determines the accessing device to be a stationary RN or a mobile RN in a way that:
   the eNB determines the accessing device to be a stationary RN or a mobile RN according to indication information received from the accessing device.

9. The method according to claim 3, wherein the eNB determines the accessing device to be a stationary RN or a mobile RN in a way that:
   the eNB determines the accessing device to be a stationary RN or a mobile RN according to indication information received from the accessing device.

10. The method according to claim 4, wherein the eNB determines the accessing device to be a stationary RN or a mobile RN in a way that:
    the eNB determines the accessing device to be a stationary RN or a mobile RN according to indication information received from the accessing device.

11. A method for transmitting an own gateway address, wherein the method comprises:
    receiving, by a mobility anchor, an Interface Setup Request message from an eNB; and
    transmitting, by the mobility anchor, its gateway IP address to the eNB,
    wherein before the mobility anchor transmits its gateway IP address to the eNB, the method further comprises:
    determining, by the mobility anchor, that the Interface Setup Request message comprises identification information indicating that the eNB is a donor eNB.

* * * * *